June 19, 1945.   C. F. CHADDOCK   2,378,830
EXPANSION BIT
Filed Aug. 21, 1943
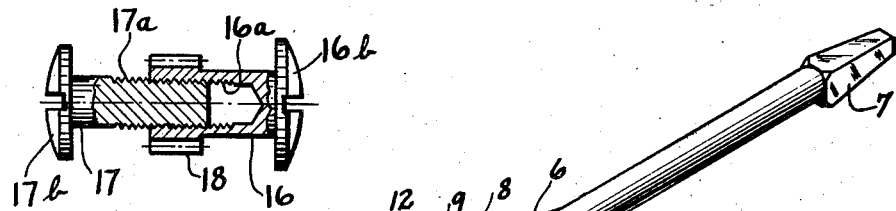
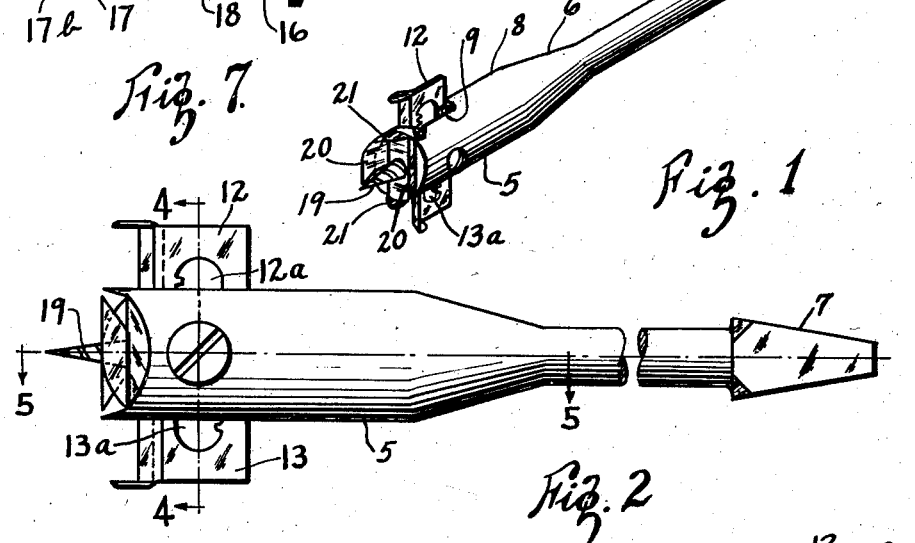
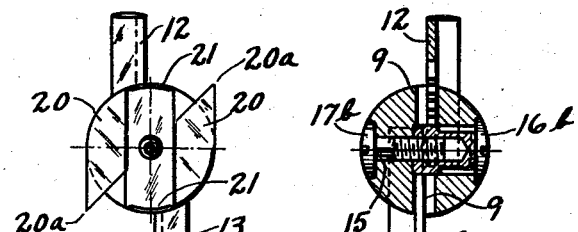
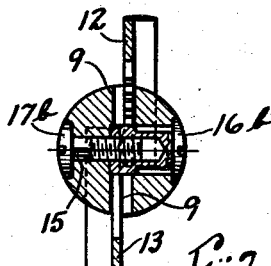
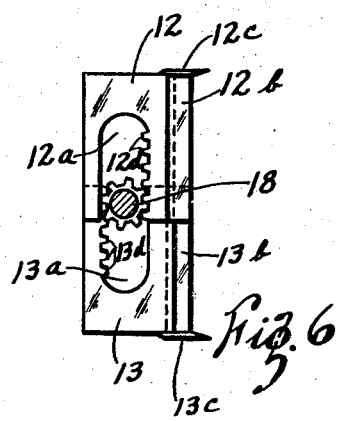
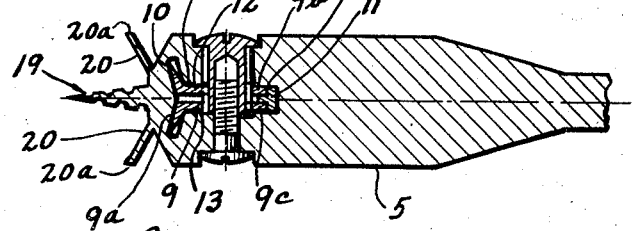
INVENTOR
BY C. F. Chaddock
A. E. Fisher
ATTORNEY Patented June 19, 1945

2,378,830

UNITED STATES PATENT OFFICE 2,378,830

EXPANSION BIT

Clarence F. Chaddock, Los Angeles, Calif.

Application August 21, 1943, Serial No. 499,464

1 Claim. (Cl. 145—127)

This invention relates to boring bits for the use of carpenters and mechanics generally, for insertion in the chucks of a brace, for boring holes in wood or other material.

The chief object of the invention is to provide, in a simple and practicable form, an expansion bit or expansible bit for use in a brace, for boring holes of various diameters, including means for adjusting the cutting blades thereof to greater or lesser degrees of diametrical spread, as may be desired.

Another object is to provide a bit of the type referred to, including a shank adapted at its rear end for insertion within the chucks of a brace, and formed at its forward end with an enlarged, cylindrical head, the said head being mortised through diametrically adjacent its forward extremity to slidably engage a pair of complemental and expansible cutting or boring blades which pass and overlap one another inwardly of the mortise and formed at these overlapping portions with elongated and aligned slots, there being a toothed rack cut or formed along one margin of each slot, said racks being in opposed relation to each other, the said slots being adapted to receive and the racks adapted to intermesh with a small pinion gear supported through a transverse bore in the head upon a two part and threadedly connected spindle, the outer ends of the spindle parts being headed and kerfed for engaging a screw driver for assembling and adjusting the device as required, as for expanding or contracting the cutting blades, the forward face or end of the bit being conventionally provided with an axially extended and tapered starting screw, and there being auxiliary and permanently fixed cutting blades arranged laterally of said starting screw.

Another object of the invention is to provide a bit of the kind referred to, the head of the bit being cylindrical in form and mortised through transversely adjacent its forward end or face, the said mortise being Y-shaped in cross section and adapted to slidably receive through its opposite ends a pair of complemental and expansible cutting blades slidably over-lapping one another within the mortise, with means for expanding or contracting these blades to adapt the bit for boring holes of various diameters, the bit being provided on its forward face or end with an axially extended starting screw and laterally disposed and permanently fixed auxiliary cutting blades.

With the stated objects in view, together with such other and additional objects and advantages as may appear from the specification, attention is directed to the accompanying drawing as embodying preferred structural features of the invention, and wherein:

Figure 1 is a perspective view of a bit as constructed in accordance with this invention, looking towards its forward or working end, and showing the pair of expansible blades as fully extended laterally.

Figure 2 is a side elevation of the bit as shown in Figure 1, and showing the two blades as expanded.

Figure 3 is an end elevation of the bit, looking towards its forward end as represented in Figure 1.

Figure 4 is a transverse section on the line 4—4 of Figure 2.

Figure 5 is a longitudinal section on the line 5—5 of Figure 2.

Figure 6 is a detail on an enlarged scale of the pair of expansible cutting blades, as assembled with the two-part gear supporting spindle, with the gear thereof in mesh with the racks formed on the two blades.

Figure 7 is a detail on an enlarged scale of the two-part gear shaft or spindle.

As shown in the drawing the bit is represented generally at 5 and includes an elongated and conventionally formed shank 6, tapered and squared at its rear end 7 for insertion within the chucks of a brace (not shown), and formed at its forward or working end with a cylindrical head 8. This head is mortised through diametrically immediately back of its forward face or end by a mortise 9 which is Y-shaped in cross section, with the divergent branches 9a thereof directed outwardly towards the forward face of the head, and with the central stem 9b thereof directed inwardly and longitudinally of the head. It is to be noted that the divergent branches of the Y-shaped mortise 9 do not open out through the face of the head 8, but that a thin protecting wall 10 of the material of the tool intervenes and completely incloses the said mortise.

A rib strip 11 whose cross-sectional shape is an inverted T is extended through and firmly seated within the bottom end of the stem 9b of the mortise 9, this bottom end constituting a groove extended diametrically through the head. Said rib strip provides an upstanding guide strip or fin 11a medially extended through this bottom end of the mortise 9, thus providing at either side of the fin 11a the slide-ways 9c.

A pair of complemental and expansible cutting blades 12 and 13 are provided, the same being formed of thin metal, oblong in shape and formed with elongated slots 12a, 13a, which open out through the inner ends of the blades, the outer margins of these blades being turned angularly aside from the planes of the blades and being sharpened to provide the cutting edges 12b, 13b, and thin and flat cutting spurs 12c, 13c being formed at the outer ends of these cutting edges 12b, 13b, the planes thereof being disposed perpendicularly to the planes of the blades.

On one margin of each of the slots 12a, 13a, are formed rows of teeth constituting the racks 12d, 13d, and it is to be noted that these racks are formed one each on the opposite margins of the two blades or blade slots, for a purpose later to be pointed out. The blades 12 and 13 are dimensioned and shaped to slide freely within and through the Y-shaped mortise 9, this assembly being accomplished by passing the two blades in at opposite ends of the mortise and at opposite sides of the center fin 11a of the rib strip 11, with the open ends of the slots 12a, 13a directed inwardly, and with the angularly outturned cutting margins of the blades as represented at 12b, 13b, directed respectively upward into the divergent branches 9a of the mortise 9. Thus the inner and slotted portions of the blades slidably over-lap one another, with their slots in mutual alignment and with their toothed margins or racks 12d, 13d oppositely positioned.

A spindle bore 15 is extended through the head 8 perpendicularly to the mortise 9 and in alignment with the slots 12a, 13a of the blades 12, 13, when the latter are inserted through the mortise 9. A two-part gear spindle 16—17 is rotatably passed through the bore 15, and through the slots of the blades, the part 16 being inserted through one end of the bore and the part 17 through the opposite end. The part 16 is bored and tapped as at 16a to threadedly engage the complementally threaded stem 17a of the part 17, and the part 16 also carries a small spur gear 18 which is firmly anchored in place and is dimensioned and adapted to intermesh with the racks 12d, 13d of the blades 12, 13, when the parts 16 and 17 are fully seated and threadedly joined through the bore 15. The spindle parts are formed with kerfed heads 16b, 17b, for engaging a screw driver in the process of assembling or adjusting the parts, the bore 15 being enlarged at each end thereof to receive and seat these heads, as the parts are threadedly turned together.

The bit is also formed and provided with the usual, axially extended starting screw 19. In addition, pairs of fixed and oppositely disposed boring blades 20 and cutting blades 21, are provided laterally of the starting screw 19, the boring blades being angularly formed and acutely pointed at their leading ends, as at 20a, and angularly out-turned, as shown, and thus adapted to eat into the wood or other material being worked, and the cutting blades being turned perpendicularly outward and tangentially disposed at the circular face of the head 8, all in spaced relation to the said starting screw 18.

In use, the blades 12, 13, are projected laterally to the extent desired by merely turning the part 16 of the two-part spindle 16—17 which carries the gear 18 as set in mesh with the racks 12d, 13d, in the proper direction for forcing these blades outwardly. The blades may be retracted as desired by the reverse turning of the part 16. When the blade adjustment is satisfactorily made, the elements are fixedly locked against further movement or slippage by merely turning the part 17 firmly into the part 16 of the said spindle 16—17.

It is thought that from the foregoing description as illustrated by the drawing, the use and operation of the device will be fully understood, and while I have here shown and described certain structural features of the invention, it is understood that these features may be changed or modified as may be found desirable, within the scope however of the claim.

I claim:

In a device of the kind described, a bit shaft formed with a cylindrical head, a Y-shaped mortise extended diametrically therethrough adjacent the forward extremity thereof and with the divergent branches of the mortise directed outwardly, a guide fin extended medially through the inner end of the stem of the mortise to provide slide-ways at either side thereof, a pair of oblong cutting blades having angularly outturned cutting margins slidably passed through the said mortise one from either end thereof and disposed one at each side of the said central guide fin, these blades over-lapping at their inner portions and formed thereat with elongated and aligned slots, a rack formed along one margin of one of the blade slots and a similar rack formed along the opposite margin of the other blade slot, a bore formed transversely through the said head perpendicularly to the said mortise and in alignment with the slots of the blades as positioned within the mortise, a two-part spindle passed through the said bore, one of the parts being tapped axially to engage the threaded stem of the other part and a spur gear anchored onto the tapped part of the two-part spindle adapted to mesh with the racks of the pair of blades.

CLARENCE F. CHADDOCK.